March 5, 1957

D. G. McALLISTER ET AL 2,784,243

HEAT TREATING FURNACE

Filed April 2, 1954

DECKER G. McALLISTER
WILLIAM J. PARSONS &
HAROLD E. MESCHER
INVENTORS

BY Paul B. Hunter

ATTORNEY

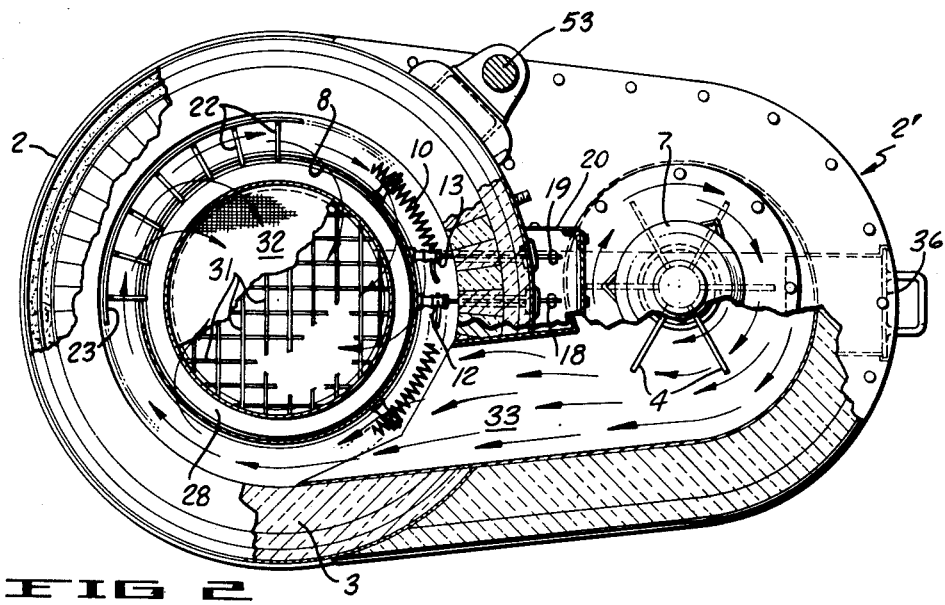
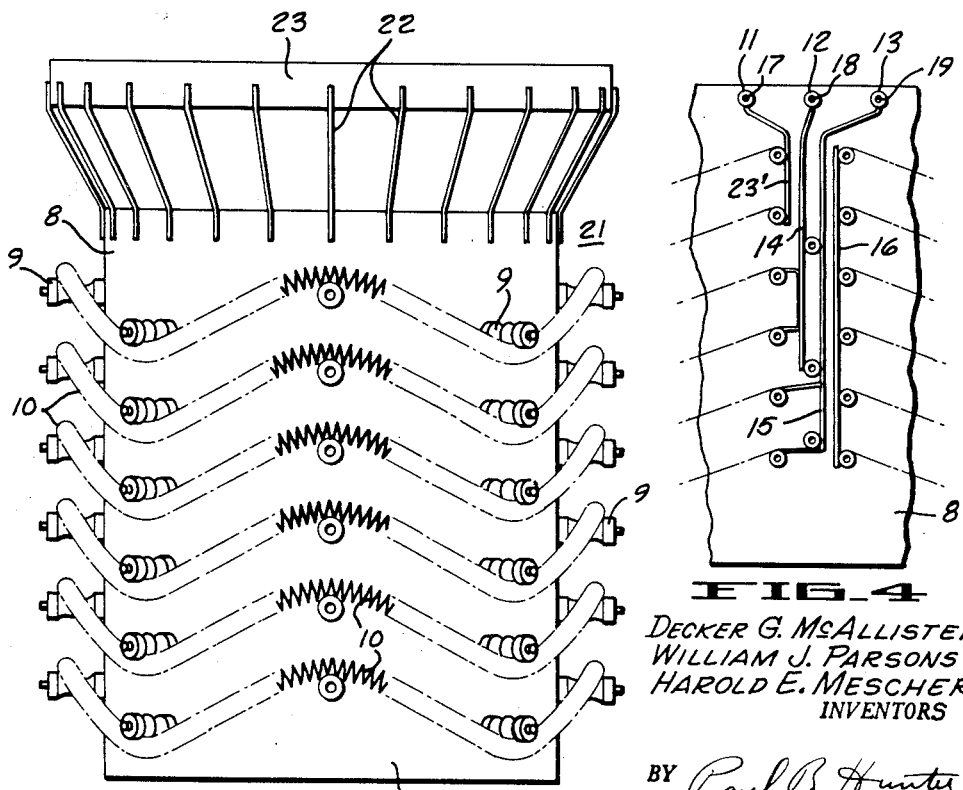

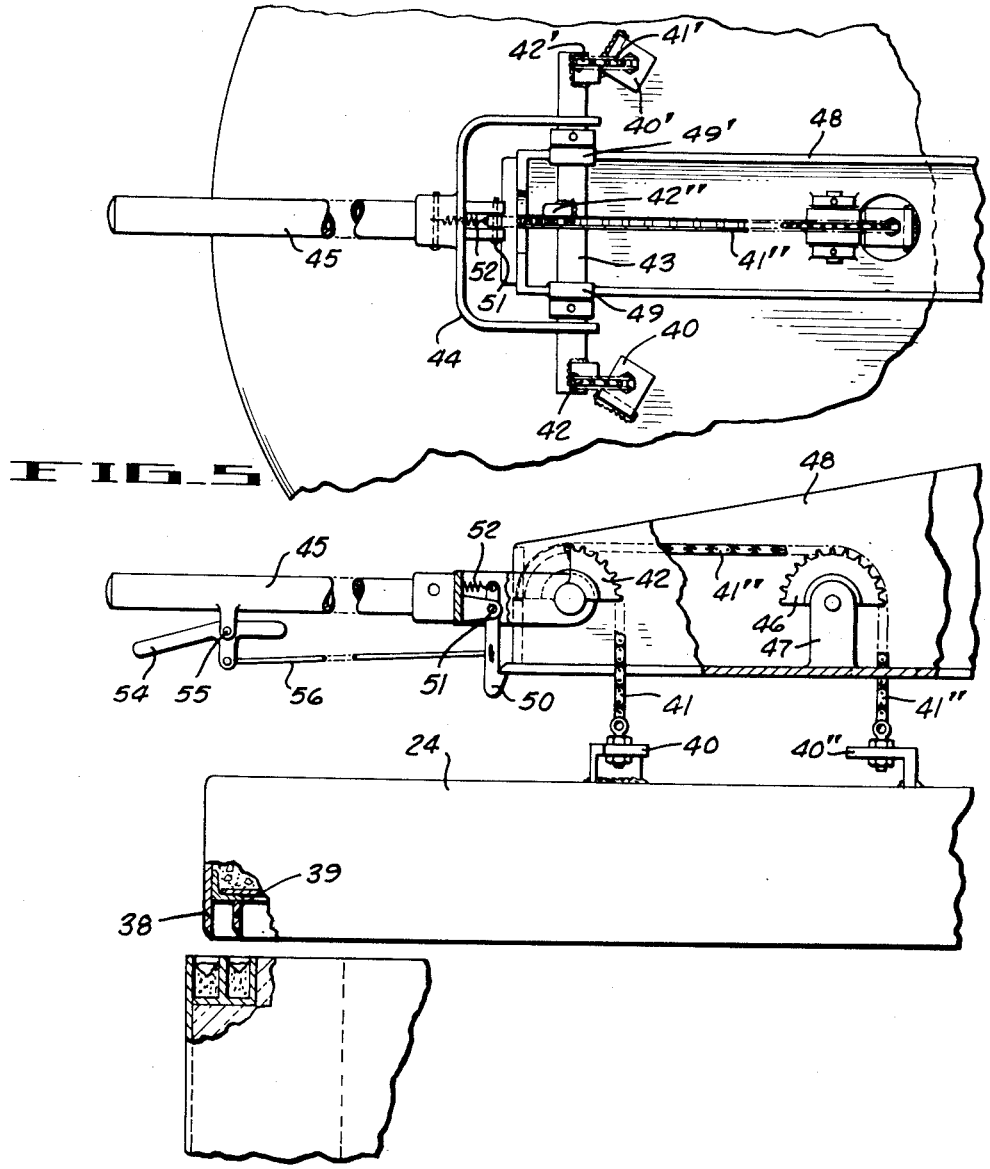

United States Patent Office 2,784,243
Patented Mar. 5, 1957

2,784,243

HEAT TREATING FURNACE

Decker G. McAllister, Burlingame, William J. Parsons, Huntington Park, and Harold E. Mescher, Rivera, Calif., assignors to Pacific Scientific Company, San Francisco, Calif., a corporation of California Application April 2, 1954, Serial No. 420,486

12 Claims. (Cl. 13—20)

This invention relates generally to furnaces, and the invention has reference more particularly to a novel electrically heated heat treating furnace adapted for tempering or the drawing of metallic members.

In the tempering or drawing of metallic members, it is desirable that the members being treated be raised uniformly and rapidly to a desired temperature and maintained at that temperature, and this requires a large amount of heat uniformly distributed and continuously applied to all the members. Heretofore, electric heat treating furnaces have been proposed employing circulating air for carrying heat to the metal members to be heated, but in practice such furnaces have not been satisfactory because they are almost universally subject to the defect of failing to provide uniform temperature throughout the region within which the metals or members being treated are situated. The tendency in these prior art devices has been to heat certain portions of the work region or work basket to far higher temperatures than other portions thereof, so that ununiform tempering and heat treatment of the contained metals or members result, causing the production of faulty members wherein stresses are not uniformly and properly relieved. The fundamental defect of most of these prior art devices is that the quantity of heat supplied to the work region is insufficient and improperly distributed to effect the desired uniform tempering action within a resonable time. Also, in these prior art devices, as a practical matter, it has been extremely difficult to remove the heating element in case of failure thereof to repair the same without initially allowing the furnace to cool.

An important feature of the present invention is to provide a novel electric heat treating furnace wherein all portions of the work region or basket are substantially uniformly heated, so that uniform results are obtained from the work or members within the basket regardless of their location therein.

Another feature of the invention is to provide a novel heat treating furnace of the above character wherein the heating unit, which also functions as a baffle for aiding in directing the flow of air around the heating unit, is readily removable as for repairing of heating elements without the necessity of cooling down the furnace or removing the work basket containing the material or members being treated.

Another feature of the invention is to provide a novel furnace of the above character that is highly efficient in conducting the heat from the heating elements directly to the work load, using both convection and conduction, so that all portions of the work load are uniformly heated, the rate of flow of heat being controlled to maintain uniformity of temperature throughout the work basket.

A further feature of the invention is to provide a heat treating furnace wherein the work basket containing the work load is surrounded by a layer of stagnant air which in turn is surrounded by the baffle supporting heating elements, so that the flow of heat by conduction from the heating elements to the work load is controlled and limited by such stagnant layer of air, while at the same time the periphery of the work load is not allowed to become chilled, as happens where the heating elements do not surround the work load.

Still another feature of the invention is to provide a novel means constituting a three point support for enabling the ready removing or replacing of the cover of the furnace as when inserting or removing the work basket.

These and other features and advantages of the present invention will become more apparent from a perusal of the following specification taken in connection with the accompanying drawings wherein:

Fig. 2 is a view taken substantially along the line 2—2 of Fig. 1, with parts broken away, looking in the direction of the arrows.

Fig. 3 is an elevational view of the heating unit with the heating elements mounted thereon.

Fig. 4 is a schematic view showing one manner of connecting the heating elements to a three phase supply line.

Fig. 5 is a plan view of the novel lift arm assembly of the present invention employed for lifting the cover of the furnace.

Fig. 6 is a view in elevation of the structure shown in Fig. 5.

Similar characters of reference are used in the above figures to designate corresponding parts.

Figure 1:
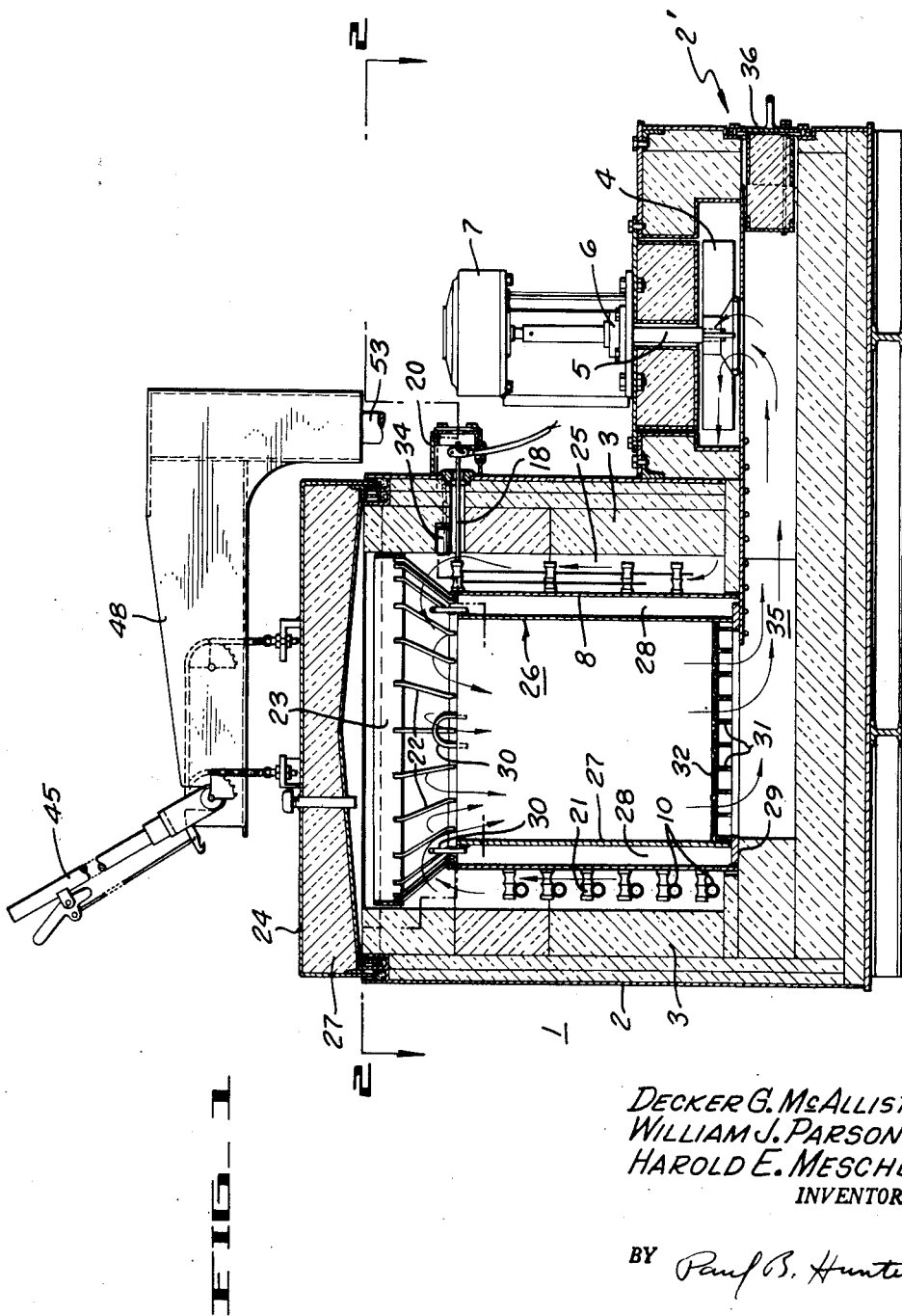
Fig. 1 is a vertical sectional view of the novel electric heat treating furnace of the present invention.

Referring now to Figs. 1 and 2 of the drawings, reference numeral 1 designates the novel heat treating furnace of this invention as a whole, the said furnace comprising a body having a sheet metal casing 2 which is lined or lagged on its inside with heat insulating material 3 such as firebrick or insulating cement. The main body of the casing 2 is substantially cylindrical, and is provided with a low offset portion 2' providing a housing for a multi-blade fan or blower 4 whose drive shaft 5 is rotatably mounted in bearing 6 and driven from motor 7.

The cylindrical portion of casing 2 is hollow, and is adapted to receive a heating unit 21 consisting of a cylindrical baffle plate 8 (see also Fig. 3) from the outside surface of which projects a series of insulating spools or posts 9 which are distributed around the exterior surface of the baffle and around which spools are disposed coiled resistance or heating wires 10. The baffle 8 is shown supporting some six circumferential rows of heating wires 10 which are illustrated wound alternately above and below the circumferentially spaced spools of any particular row. As shown in Fig. 4, the six rows may be divided into three pairs consisting of three sets of two adjacent rows each, connected respectively through bus bars 23', 14 and 15, to terminal spools 11, 12, and 13, these connections providing in conjunction with a common bus bar 16 a three phase Y connection to be fed from a three phase supply line which is connected to removable terminal rods 17, 18 and 19 projecting from the terminal spools 11, 12 and 13 into the terminal box 20.

The upper peripheral portion of the cylindrical baffle 8 of the heating unit 21 has a series of rods or bars 22 fixed thereon, as by welding which rods extend upwardly and outwardly somewhat and have their upper ends connected to a guide ring member 23 which is slightly smaller in diameter than the inner diameter of the insulating material 3 forming the inner wall of the casing 2. The ring 23 serves to position the heating unit 21 coaxially within the hollow cylindrical chamber of the furnace when the heating unit is lowered thereinto as when the removable closing member or cover 24 is removed for this purpose. With the heating unit thusly placed within the furnace, an annular space 25 is provided between the insulation 3 and the baffle 8 allowing for the passage of swirling air currents moving upwardly and circumferentially as will be further explained. The rods 22 not only serve to position the baffle 8 with respect to the ring 23 and hence with respect to the inner wall of the casing, but also serve to guide the work basket 26 into the hollow interior of the heating unit in use.

This work basket is shown as comprising a cylindrical hollow member 27, as of sheet metal, that is of lesser diameter than the baffle 8, whereby an annular substantially dead air space 28 closed at its sides and bottom is formed between the outer walls of the work basket 26 and the baffle 8 when the basket is set into the furnace. The basket 26 is shown resting upon an annular metallic ring 29 positioned in the lower portion of the furnace. This basket is open at the top and provided with handles 30 for enabling the ready lifting of the same into and out of the furnace either by hand or as by use of an overhead crane. The bottom of this furnace is made up of an open metal grid 31 attached at its periphery to the cylindrical members 27 and supporting upon its upper surface a screen 32 for supporting the work load. Thus, air can circulate through the open top of the work basket 26 downwardly and around the work pieces therein and out through the bottom of this basket, as shown by the arrows in Fig. 1 of the drawings. The air delivery space surrounding the fan 4 is connected by a tangential passage 33 (see Fig. 2) which extends to the annular space provided between the wall insulation 3 and the heating unit baffle 8.

Thus, in use, air is driven from the fan 4 through passage 33 into the annular space 25 and swirls circumferentially around the baffle 8 while rising up and over the heating wire coils 10 gradually becoming hotter until it reaches the top of the baffle 8, at which point it has reached its maximum temperature as controlled by thermostat 34 and then flows over, as shown by the arrows, into the basket, passing downwardly therethrough, over the metal parts therein to heat these parts uniformly, and finally passes out through the screen 32 and grid 31 into a return passage 35 which conveys the air back to the intake of fan 4.

In furnaces as heretofore constructed, the heating coils are not located around the periphery of the work basket with a dead air space provided between the basket and the coils, so that the periphery of the work basket, being heretofore generally immediately adjacent the side walls of the furnace, tends to become chilled, causing the work near the walls of the work basket to be insufficiently heated, whereas the work in the center of the basket is overheated in use. By using the novel construction of the present invention, since the work basket is completely surrounded by the heating unit, and since an annular dead air space 28 is provided between the heating unit and the work basket, heat from the heating coils passes largely by conduction through this dead air space to the peripheral surface of the work basket cylindrical side wall 27 and from thence to the work within the basket, so that the peripheral portions of the work in the basket do not become unduly chilled, while maintaining the same temperature as the work in the middle of the basket that is supplied with hot air passing from space 25. The dead air space 28 serves the important function of preventing undue localized heating of portions of the wall 27 in the immediate proximity of the respective wires 10. In other words, in conducting heat through the dead air space 28, this space serves to distribute the heat conducted from the several coils so that the entire surface of the cylindrical basket wall 27 is heated uniformly rather than being heated ununiformly and overheated in certain regions which would result in the absence of the dead air space 28. Also, since heating coils are also located closely adjacent the top of the basket 26, there is no chance for the air to cool before entering the basket, so maximum heat transfer is effected in the furnace of the present invention. A clean-out plug 36 is shown positioned in the end of passage 35 for enabling the ready cleaning out of the bottom of the furnace.

The cylindrical cover 24 of the furnace is shown provided with a sheet metal casing having insulation 27 therewithin. The casing is shown provided with a pair of mutually spaced dependent annular flanges 38 and 39 (see also Figs. 5 and 6), which flanges are adapted to project into corresponding annular grooves containing packing or sealing material provided in the upper edge of the casing 2 of the furnace. Thus, with the cover resting upon the top of the furnace, the flanges 38 and 39 cooperate with the sealing material in the cooperating grooves to tightly seal the furnace. A three point support is provided for raising and lowering the cover 24, so that it can settle into the packing or sealing material at any angle depending upon how this material is distributed in the grooves provided therefor. This three point support is provided by means of three brackets 40, 40' and 40" distributed substantially 120° apart with respect to the central vertical axis of the cover 24. These brackets are connected by chains 41, 41' and 41" which pass over sprocket sectors 42, 42' and 42" that are fixed a shaft 43 to which shaft is fixed a yoke 44 carrying a handle 45. The chain 41" also passes over a semi-circular idler sprocket 46 which is carried by a pedestal 47 mounted on a swivel arm 48, which arm also rotatably supports the shaft 43 in bearings 49 and 49'. By turning the handle 45 from its upturned position shown in Fig. 1 to its downturned position shown in Fig. 6, the sprocket sectors 42, 42' and 42" turn counter-clockwise, and, since the chains are fixed to these sprocket sectors, the chains are forced to move thereby raising the lid 24, the three point support of the lid serving to raise the same smoothly while retaining the same level regardless of any inclination of this top present while the same is resting within the grooves provided in the upper surface of the casing 2. A latch 50 is pivoted at 51 and is urged by a spring 52 to engage the under surface of arm 48 when the cover 24 is in its upper position as shown in Fig. 6, thereby retaining this cover in its raised or upper position. When in this positon, the cover can be swung to one sde by turning the swivel arm 48 about its vertical supporting shaft 53, thereby permitting access to the interior of the furnace 1, so that the basket 26 can be put in or taken out as desired. When it is desired to close the furnace, it is merely necessary to swing the arm 48 so that cover 24 again overlies the casing 2, whereupon the latch 50 can be released by means of bell crank lever 54 pivoted at 55 upon handle 45, this lever being connected by link 56 to the latch 50. By grasping the handle 45, the lever 54 can also be grapsed and actuated to release the latch 50, whereupon, by raising handle 45, the lid 24 is again lowered so that the flanges 38 and 39 again enter the recesses provided therefor in the furnace casing 2 and permit the cover to rest snugly upon the packing material, thus sealing the top of the furnace.

It will be noted that should any of the heating wires 10 burn out in use, it is merely necessary to remove the cover and lift the heating unit directly out of the furnace after removing terminal rods 17, 18 and 19, without the necessity of cooling the furnace or removing the work basket, whereupon the heating unit can be repaired and returned to continue the heat.

Thus, it will be noted that in use the major part of the heat used is transferred to the air as it swirls around the heating unit 21. Since this heating unit is close to the point at which the temperature is controlled, i. e., the thermostat 34, which is just before the air passes around bars 22 into the top of the work basket, excellent temperature control of the air results since there is substantially no temperature drop of the air before it reaches the work load.

This heat transfer of the air is supplemented by heat transferred directly by heat conduction from the heating coils through the wall of the baffle 8 and through the dead air space 28 which acts to control the rate of flow and uniformly distribute this heat. This heat flows uniformly through the side walls of the work basket. Thus, instead of heat being lost outwardly from the basket, as often happens in furnaces heretofore built, heat is supplied uniformly to the peripheral walls of the basket resulting in a uniformly treated product.

Since many changes could be made in the above construction of the novel electrically heated heat treating furnace of this invention and many apparently widely different embodiments of this invention could be made without departing from the scope thereof, it is intended that all matter contained in the description or shown in the accompanying drawings shall be interpreted as illustrative and not in a limiting sense.

What is claimed is:

1. A heat treating furnace comprising a body providing a work receiving chamber, a closure member for said chamber, and a hollow heating unit insertable into said chamber in surrounding relation to any work therein, said heating unit having heating elements on the exterior wall thereof and cooperating with the chamber wall of said body to provide a circulating space for air heated by said elements, said heating unit being readily removable as for repair upon the opening of said closure member.

2. A heat treating furnace comprising a body providing a work receiving chamber, a closure member for said chamber, a work receiving container within said chamber, a hollow heating unit within said chamber in surrounding relation to said work container, said heating unit having heating elements on the exterior surface thereof and having an upper outer extension for engaging the inner wall of said receiving chamber to position said heating unit so that said heating elements are spaced from said inner wall, said container and said heating unit being readily and independently insertable into and removable from said chamber upon the opening of said closure member.

3. A heat treating furnace comprising a body providing a work receiving chamber, a closure member for said chamber, a work receiving container insertable into and removable from said chamber, a heating unit within said chamber in surrounding relation to said work container, said heating unit having heating elements thereon and being readily removable from said chamber for repairing said heating elements, said chamber and said heating unit being so constructed and arranged as to provide a circulating air space therebetween containing said heating elements, said container having openings therein, and means for circulating air over said heating elements and through the openings in said container to heat the work therein in conjunction with heat received by radiation and conduction directly from said heating elements, whereby uniform heating of the contents of said container is obtained.

4. A furnace of the character described comprising an insulated casing open at its top and having a chamber for receiving a work basket adapted to be lowered into said chamber through the open top, a hollow heating unit surrounding the work basket within said chamber and having heating elements on the exterior surface thereof, said heating unit being readily inserted into and removed from said chamber as for repairing said heating elements during a heat without disturbing the work basket, and blower means for circulating air around said heating elements and through the work basket.

5. A furnace as defined in claim 4 having a removable cover for said open top and means comprising movable supporting means and flexible connectors connected to spaced points on said supporting means and on said cover for providing a three point support for said cover for placing said cover upon said casing and for removing the same therefrom, said three point support enabling said cover to adjust itself to any irregularity of the top of said casing, whereby a tight joint is provided between the cover and the casing top regardless of such irregularity.

6. A furnace of the character described comprising a substantially cylindrical furnace main body provided with an offset portion, said main body having a cylindrical recess for receiving a cylindrical work basket open at its top and perforated at its bottom, a hollow substantially cylindrical heating unit surrounding said work basket and having heating elements on the exterior surface thereof adjacent the wall of said recess, said heating unit being insertable into and removable from said recess without disturbing the work basket as for replacement of said heating elements during a heat, and fan means mounted in said body offset portion for circulating heating air from said fan through said offset portion, upwardly around said heating unit and said heating elements, down through said basket and back through said offset portion to said fan.

7. A furnace as defined in claim 6 wherein an annular dead air space is provided between said heating unit and said work basket whereby heat supplied directly from said heating unit substantially by conduction through said dead air space is controlled and uniformly distributed before reaching the side walls of said work basket, thereby eliminating hot spots on the side walls of said work basket.

8. A furnace having a work basket receiving recess, a heating unit for said recess, said heating unit comprising a cylindrical baffle plate having heating coils carried by insulating spools projecting substantially radially outwardly from said baffle plate, a guide ring member positioned slightly outwardly of said heating coils for centering said heating unit within said furnace recess, and bars connecting said baffle plate to said guide ring, said bars serving to guide the work basket into the interior of said heating unit in use while also permitting the passage of heating air therethrough.

9. In a furnace having a work receiving chamber open at its top for receiving a work basket, a heating unit for heating the work within said basket comprising a hollow baffle member readily insertable into and removable from said chamber in surrounding relation to the work basket, said baffle having heating elements mounted on the exterior wall thereof to be positioned in the space between said baffle and the inner wall of said chamber, and means for circulating air up through said space to be heated by said elements and then inwardly and down through the work in the work basket.

10. A heat treating furnace having a casing providing a work receiving chamber open at its top, a cover for closing said furnace casing chamber, said cover having a depending portion and said casing having a receiving groove in its upper surface for receiving said depending portion, said groove containing sealing material for cooperating with said cover depending portion to seal off said furnace chamber, chains connected to three points on said cover spaced angularly with respect to one another about the central axis of said cover exteriorly of the center of gravity thereof, three angularly spaced supporting sprockets positioned above said cover over which said chains pass, a swinging arm supporting said sprockets, and means for turning said sprockets for raising and lowering said cover with respect to said furnace, said chains serving to maintain said cover in a horizontal position during raising and lowering thereof regardless of external forces acting on said cover so that said depending cover portion readily enters said receiving groove, said chains permitting said depending cover portion to adjust itself on contact with the sealing material in said groove, as by tilting of said cover, to thereby secure a tight seal between the cover and the furnace casing.

11. A heat treating furnace as defined in claim 10 wherein said sprocket turning means comprises a lever carried by said swinging arm, said lever also serving with said cover raised for swinging said arm and cover to one side to permit access to said work receiving chamber.

12. In a furnace having a work receiving chamber open at its top for receiving material to be treated, said furnace having a groove at its top surrounding said chamber containing sealing material, a cover for said chamber, said cover having a depending portion for entering said furnace groove, three flexible connectors connected to suitably spaced points on said cover, the center of gravity of said cover lying within the region encompassed by said points of connection, a supporting member for said connectors arranged for supporting said connectors also at three spaced points above said cover, and means on said supporting member for moving said connectors up and down to raise and lower said cover while holding the same horizontal, said connectors permitting said cover to tilt upon its depending portion contacting the sealing material within the groove of said furnace top, to thereby completely seal said chamber.

References Cited in the file of this patent

UNITED STATES PATENTS

| 1,335,199 | Ruthenburg | Mar. 30, 1920 |
| 1,464,499 | Colby | Aug. 14, 1923 |
| 1,686,009 | Keene | Oct. 2, 1928 |
| 1,721,840 | Smith | July 23, 1929 |
| 2,400,056 | Wheat et al. | May 7, 1946 |
| 2,611,790 | Koch | Sept. 23, 1952 |

FOREIGN PATENTS

| 416,157 | Great Britain | Sept. 13, 1934 |